United States Patent
Trebouet et al.

(10) Patent No.: US 10,768,412 B2
(45) Date of Patent: Sep. 8, 2020

(54) DEVICE FOR PROTECTING AN OPTICAL SENSOR AND ASSOCIATED DRIVING ASSISTANCE SYSTEM

(71) Applicant: Valeo Systèmes d'Essuyage, Le Mesnil Saint Denis (FR)

(72) Inventors: Marcel Trebouet, Le Mesnil Saint Denis (FR); Frédéric Bretagnol, Issoire (FR); Giuseppe Grasso, Issoire (FR); Frederic Gossele, Bobigny (FR); Denis Garnier, Bobigny (FR); Nicolas Pinchon, Bobigny (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/981,391

(22) Filed: May 16, 2018

(65) Prior Publication Data
US 2018/0335622 A1    Nov. 22, 2018

(30) Foreign Application Priority Data
May 17, 2017    (FR) ..................................... 17 54343

(51) Int. Cl.
*G02B 27/00* (2006.01)
*B60R 11/04* (2006.01)
(Continued)

(52) U.S. Cl.
CPC .......... *G02B 27/0006* (2013.01); *B60R 11/04* (2013.01); *H04N 5/2252* (2013.01);
(Continued)

(58) Field of Classification Search
CPC .................................................. G02B 27/0006
See application file for complete search history.

(56) References Cited

U.S. PATENT DOCUMENTS 3,879,742 A    4/1975 Smith
5,315,333 A    5/1994 Nash
(Continued)

FOREIGN PATENT DOCUMENTS

JP    07287151 A    * 10/1995
JP    2008165093 A   * 7/2008
KR    20070034729 A   3/2007

OTHER PUBLICATIONS

Preliminary Search Report and Written Opinion issued in corresponding French Application No. 1754343, dated Jan. 10, 2018 (6 pages).

*Primary Examiner* — Clayton E. LaBalle
*Assistant Examiner* — Leon W Rhodes, Jr.
(74) *Attorney, Agent, or Firm* — Osha Liang LLP (57) ABSTRACT

A device for an optical sensor for a motor vehicle and a corresponding driver-assistance system are disclosed. The optical sensor includes an optic. The device includes a housing that is mounted so as to be able to rotate around an axis of rotation and that has a compartment that is configured to accommodate the optical sensor, and an optical element that is securely fastened to the housing. The optical element has at least one planar surface that is configured to be placed in the field of view of the optical sensor. The device also includes and an actuator that is coupled to the housing in order to drive the housing and the optical element to rotate.

17 Claims, 4 Drawing Sheets

(51) Int. Cl.
*H04N 5/225* (2006.01)
*B60R 11/00* (2006.01)
*B08B 7/00* (2006.01)
*G03B 17/08* (2006.01)

(52) U.S. Cl.
CPC ......... *B08B 7/00* (2013.01); *B60R 2011/0085* (2013.01); *B60R 2011/0092* (2013.01); *B60R 2300/101* (2013.01); *B60R 2300/40* (2013.01); *G03B 17/08* (2013.01)

(56) References Cited

U.S. PATENT DOCUMENTS

| | | | |
|---|---|---|---|
| 7,965,336 B2* | 6/2011 | Bingle | B60R 1/04 |
| | | | 348/374 |
| 8,891,007 B2* | 11/2014 | Pavithran | H04N 5/2252 |
| | | | 348/374 |
| 2007/0217782 A1* | 9/2007 | McCutchen | G03B 17/00 |
| | | | 396/427 |
| 2011/0181725 A1* | 7/2011 | Matsuura | G03B 17/02 |
| | | | 348/148 |
| 2015/0160377 A1* | 6/2015 | Kuroda | G02B 1/118 |
| | | | 428/141 |
| 2016/0001330 A1* | 1/2016 | Romack | B08B 3/02 |
| | | | 134/18 |

* cited by examiner

DEVICE FOR PROTECTING AN OPTICAL SENSOR AND ASSOCIATED DRIVING ASSISTANCE SYSTEM

The present invention relates to the field of assisting drivers and in particular to driver-assistance systems, which are installed in certain vehicles, the driver-assistance system possibly including an optical sensor, such as for example a camera comprising an objective, in particular comprising at least one lens. More particularly, the invention relates to a device for protecting such an optical sensor.

Currently, many motor vehicles are equipped with front-, rear- or even side-view cameras. They in particular four part of driver-assistance systems, such as parking-assistance systems, or even systems for detecting lane departure.

Cameras that are installed in the interior of the passenger compartment of a vehicle against the rear windscreen/window and that point backward through the rear windscreen of the vehicle are known. These cameras are well protected from exterior climatic events and grime caused by mineral or organic pollutants. However, the angle of view for such cameras, installed in the interior of the passenger compartment, is not optimal, in particular for a parking-assistance system, for example because they do not allow obstacles located in proximity to the rear of the vehicle to be seen.

For this reason, it is therefore preferred to install the cameras of driver-assistance systems on the exterior of vehicles in various locations depending on the desired use, for example in the region of the front or rear bumper, or in the region of the front or rear number plate of the vehicle. In this case, the camera is therefore highly exposed to being spattered with organic or mineral dirt that may be deposited on its optic and thus decrease its effectiveness, or even make it inoperative. In particular, during periods of wet weather, rain and dirt is observed to spatter, this spatter possibly greatly affecting the operability of the driver-assistance system comprising such a camera. The surfaces of the optics of these cameras must be cleaned in order to guarantee they remain in a good operating state.

To counter the deposition of dirt on the camera, it is known to arrange a device for cleaning the optic of the camera, generally a sprayer of cleaning liquid, in proximity thereto, in order to remove the polluting elements that are deposited over time. However, the use of these sprayers leads to an increase in the operating costs of such a driver-assistance system because they require quite large amounts of cleaning liquid to be used.

According to one known solution, means for vibrating a protecting window of the camera are provided in order to shed dirt from the protecting window of the camera. However, it has been observed that the effectiveness of such a device for tenacious and encrusted grime may be limited despite the vibration of the protecting window.

According to another solution, the camera is arranged in a protecting device. However, such a protecting device is very bulky to install.

The present invention proposes to at least partially remedy the aforementioned drawbacks by providing an alternative device for protecting an optical sensor, allowing the deposition of grime on an optical sensor, such as a camera, to be prevented.

To this end, one subject of the invention is a device for protecting an optical sensor for a motor vehicle, said optical sensor comprising an optic, characterized in that the device includes:

a housing that is mounted so as to be able to rotate around an axis of rotation and that has a compartment that is configured to accommodate the optical sensor;

an optical element that is securely fastened to the housing, the optical element having at least one planar surface that is configured to be placed in the field of view of the optical sensor; and an actuator that is coupled to the housing in order to drive the housing and the optical element to rotate.

The at least partially planar optical element may be produced simply.

Said device for protecting the optical sensor may furthermore have one or more of the following features, individually or in combination:

the optical element is at least partially transparent;

the optical element is configured to be placed upstream of the housing facing a road scene images of which the optical sensor is configured to participate in capturing;

said at least one planar surface has an extent larger than or equal to the extent of the field of view of the optical sensor;

the optical element is configured to be arranged so that said at least one planar surface is centred with respect to the optical sensor;

the optical element includes an internal surface and an external surface that are opposite and respectively at least partially planar in the field of view of the optical sensor;

the internal and/or external surface of the optical element is partially or completely planar in all the field of view of the optic of the optical sensor;

the internal surface and the external surface are parallel;

the internal surface has an anti-fog property, the internal surface of the optical element in particular having an anti-fog coating;

the internal and/or external surface has at least one property chosen from the following list: infrared filter, photocatalytic, hydrophobic, superhydrophobic, lipophobic, hydrophilic, superhydrophilic, stone-chip resistant;

the optical element is configured to be placed upstream of the optic of the optical sensor so that the optical axis of the optical element is coincident with the optical axis of the optical sensor;

the optical element is placed centred with respect to the axis of rotation of the housing;

the compartment of the housing is configured to accommodate the optical sensor so that the optical axis of the optical sensor is coincident with the axis of rotation;

the compartment for the optical sensor is defined by a wall of the housing;

the wall is centred on the axis of rotation of the housing;

the housing includes at least one through-orifice;

the actuator is arranged to the rear of the housing.

The invention also relates to a driver-assistance system including an optical sensor comprising an optic. According to the invention, said system furthermore includes a device for protecting the optical sensor such as defined above.

According to one embodiment, the optical element is separate from the optical sensor.

According to one aspect of the invention, said at least one planar surface of the device has an extent larger than or equal to the extent of the field of view of the optical sensor.

According to another aspect of the invention, the optical sensor accommodated in the housing has a field of view of angle strictly smaller than 180°, in particular smaller than or equal to 150°, and especially smaller than or equal to 120°.

In particular, the angle of the field of view may be comprised between 40° and 130°, preferably between 50° and 120°, and for example be about 110°.

According to another example, the optical sensor accommodated in the housing has a field of view of angle of about 60°, in particular in order to be able to take images of a blindspot.

Other features and advantages of the invention will become more clearly apparent on reading the following description, which is given by way of nonlimiting illustrative example, and the appended drawings, in which.

In these figures, identical elements have been referenced with the same references.

The following implementations are examples. Although the description refers to one or more embodiments, this does not necessarily mean that each reference relates to the same embodiment, or that the features apply to just one embodiment. Single features of various embodiments can also be combined or interchanged in order to create other embodiments.

In the description, certain elements, such as for example the first element or second element, may be indexed. In this case, the index is simply used to differentiate and denote elements that are similar but not identical. This indexing does not imply a priority of one element with respect to another and such denominations may easily be interchanged without departing from the scope of the present description. This indexing also does not imply an order in time.

Figure 1:
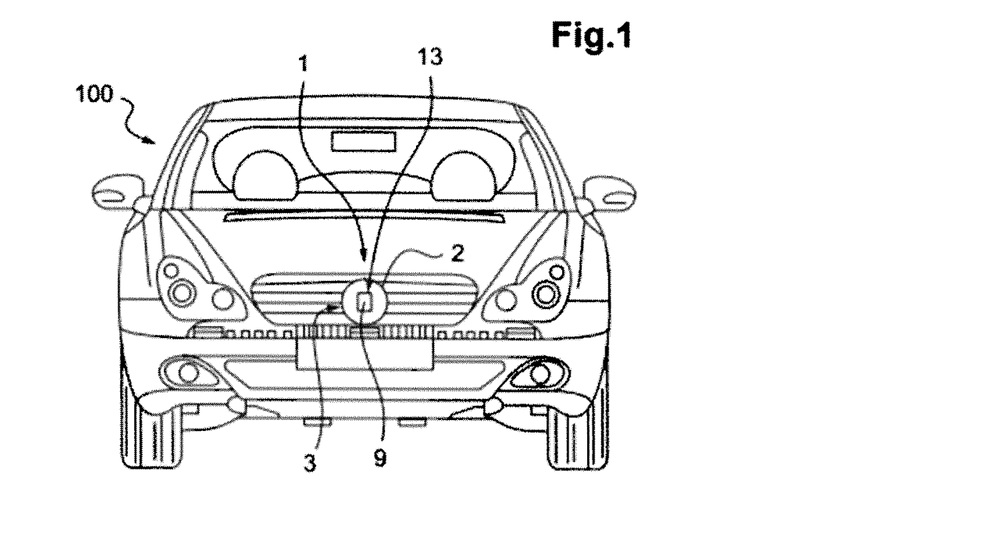
FIG. 1 schematically shows a motor vehicle comprising a driver-assistance system according to the invention.

FIG. 1 shows a motor vehicle 100 equipped with at least one driver-assistance system 1 according to the invention.

Figure 2:
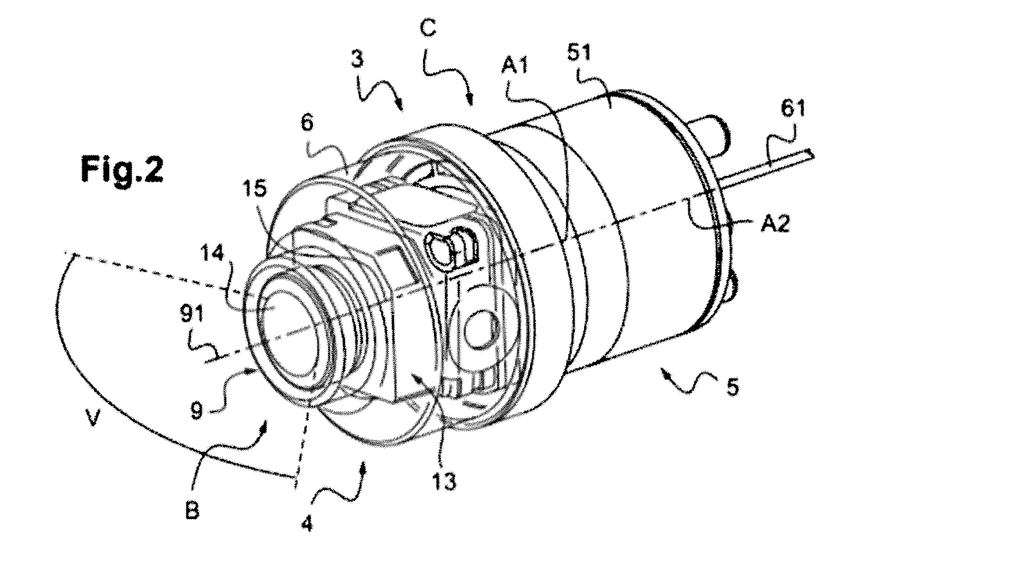
FIG. 2 is a perspective view of a device for protecting an optical sensor of the driver-assistance system of FIG. 1.
Figure 3:
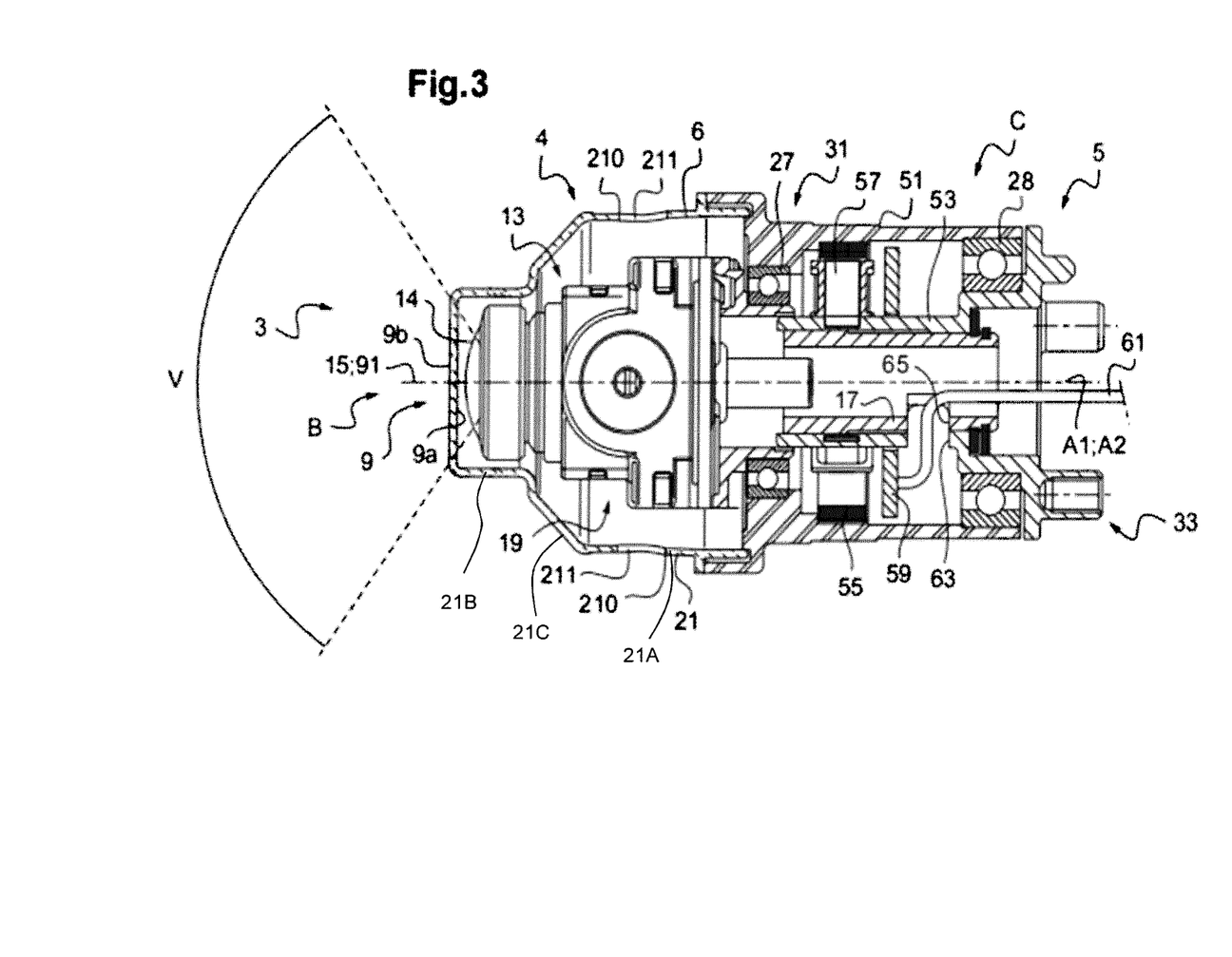
FIG. 3 is a partial longitudinal cross-sectional view of the protecting device of FIG. 2.

The driver-assistance system 1 in particular includes at least one optical sensor 13 and a device 3 for protecting the optical sensor 13, which may be more clearly seen in FIGS. 2 and 3.

The optical sensor 13 is for example an image-capturing optical sensor 13 such as a camera. It may be a question of a CCD (charge-coupled device) sensor or a CMOS sensor including a matrix array of miniature photodiodes. According to another variant, it may be a question of a LIDAR sensor, LIDAR standing for "light detection and ranging".

As may be more clearly seen in FIGS. 2 and 3, the optical sensor 13 includes an optic 14 of optical axis 15. The optic 14 is for example an objective. An objective may include at least one lens, and in particular, depending on the field of view and resolution, a plurality of lenses, for example between two and ten lenses, generally four or five lenses, or even ten lenses in the case of a fish-eye lens. At least one of the lenses of the optic 14 is convex (curved), its convexity for example being oriented toward the exterior of the optical sensor 13 such as a fish-eye.

The optical sensor 13 may in addition include a portion forming a holder 17 (FIG. 3) of the optical sensor 13. It is here a question of a rear portion of the optical sensor 13, on the side opposite to the optic 14.

In the illustrated embodiment, the optical sensor 13 is intended to be mounted in the protecting device 3. More precisely, the optical sensor 13 and in particular its holder 17 are intended to be fixedly mounted in the protecting device 3.

In the example illustrated in FIG. 1, the protecting device 3 is installed at the front of the vehicle 100 in the region of a bumper. Of course, as a variant, the protecting device 3 may be installed at the rear of the vehicle 100, for example in the region of the bumper or number plate. It may also for example be installed on the sides of the vehicle, for example in the region of the rearview mirrors.

The protecting device 3 may be fastened, using any known technique, to any element 2 of the vehicle 100, such as to an element of the body or to an exterior element such as a bumper, a rearview mirror or a number plate. For this purpose, mention may be made, non-exhaustively, of a system of clips, a screwing system, or even an adhesive-bonding system.

Protecting Device

More precisely, with reference once again to FIGS. 2 and 3, the protecting device 3 includes:

at least one accessory 4 for a motor vehicle 100 (the reader is also referred to FIG. 1), this accessory 4 being mounted so as to be able to rotate about an axis of rotation A1 and having the function of protecting the optical sensor 13; and an actuator, and more precisely a motor 5, that is configured to drive the accessory 4 to rotate.

The protecting device 3 is therefore a motorized device.

In particular, the protecting device 3 may include a first subassembly B and a second subassembly C that are separate from and assembled with each other. The first subassembly B may form the accessory 4 for a motor vehicle 100. The second subassembly C may include the motor 5, in order to drive the first subassembly B to rotate.

Accessory

The accessory 4 or protecting means may be at least partially transparent.

In the described embodiment, the accessory 4, and more generally the protecting device 3, includes a housing 6 and an optical element 9 that is securely fastened to the housing 6 (see FIGS. 2 and 3).

The optical element 9 and the housing 6 may form a single part. Alternatively, the housing 6 and the optical element 9 may be two separate securely-fastened parts.

The optical element 9 and the housing 6 are described in more detail below.

As regards the housing 6, it is mounted so as to be able to rotate around the axis of rotation A1.

Preferably, the housing 6 is a seal-tight housing. The housing 6 may be made of any suitable material known to those skilled in the art.

More precisely, this housing 6 is arranged so as to be driven to rotate by the motor 5, this allowing the optical element 9 to rotate. The optical element 9 is therefore, in this particular example, configured to be driven to rotate with the housing 6, so as to allow the optical element 9 to be cleaned via a centrifugal effect.

The optical element 9 is configured to be placed at the front of the housing 6. The expression "front of the housing 6" is understood to mean that portion of the housing 6 which is intended to be placed facing the road scene images of which the optical sensor 13 participates in capturing, when the protecting device 3 is installed in the vehicle 100 (the reader is also referred to FIG. 1). In contrast, the expression "rear of the housing 6" is understood to mean that portion of the housing 6 which is opposite the front of the housing 6 and it is therefore the portion that is furthest from the road scene images of which the optical sensor 13 participates in capturing.

In addition, the optical sensor 13 is, in this example, at least partially mounted in the housing 6. To achieve this, the housing 6 includes a compartment 19 (see FIG. 3) that is configured to accommodate the optical sensor 13, for example so that the optical axis 15 of the optical sensor 13 is coincident with the axis of rotation A1 of the housing 6.

More precisely, the housing 6 includes a wall 21 defining the compartment 19 for the optical sensor 13. This wall 21 may be centred on the axis of rotation A1 of the optical element 9 and of the housing 6. In this example, the wall 21 is of substantially cylindrical general shape.

According to a first variant, the wall 21 and the optical element 9 may form a single part. According to a second variant, the wall 21 and the optical element 9 may be two separate parts, and in this case the wall 21 is securely fastened to one end of the optical element 9. In particular the front end of the wall 21 is securely fastened to the optical element 9. By way of nonlimiting example, the wall 21 and the optical element 9 may be securely fastened by ultrasonic welding. Thus, the housing 6 and the optical element 9 may be one or more parts. Since the housing 6 is securely fastened to the optical element 9, a seal-tight unit is formed that thus prevents grime from getting into the interior of the housing 6 that is intended to accommodate the optical sensor 13.

Such as illustrated in the figures, and especially visible in FIG. 3, the wall 21 bounding the housing 6 has a profile that is tailored to the shape of the optical sensor 13 that is placed in the compartment 19. The wall 21 thus has a rear first portion 21A that is on the side of the motor 5 and that has a first diameter designed to encircle the body 13A of the optical sensor, which is of rectangular or square cross section, and a front second portion 21B that has a second diameter that is smaller than the first diameter and that is designed to fit around an end 13B of circular cross-section of the optical sensor. The optical element 9 is placed at the end of the wall 21, on the second portion 21B. A frustoconical section 21C of the wall 21 allows the rear first portion and the front second portion to be linked.

The protecting device 3 is arranged in the element 2 of the vehicle 100 so that the optical element 9, which is placed at the end of the wall 21 corresponding to the front second portion of this wall, lies flush with the external surface of the element 2 of the vehicle 100, this element possibly being a body element or an exterior element such as a bumper, a rearview mirror or a number plate.

According to the invention, the size of the aperture that must be produced in the element 2 of the vehicle to house the protecting device and to pass the optical element 9 need be no larger than the second diameter of the front second portion 21B. It is advantageous for the diameter of this aperture to be as close as possible to the diameter of the end of the circular segment of the optical sensor, in order for the visual appearance of the element 2 of the vehicle to be substantially the same independently of whether the vehicle is equipped with a protecting device around the optical sensor or not.

The profiled aspect of the protecting device, namely a front second portion 21B of smaller diameter than that of the rear first portion 21A, allows, in the case of an optical element 9 that is securely fastened to the front end of the front second portion of the housing 6, the surface placed in front of the optic 14 to be formed essentially by the optical element 9, this allowing this optical element to be directly butt-fastened to the housing, to the edges of free ends of the wall, this facilitating the fastening operation.

Moreover, since the front second portion 21B bearing the optical element has a smaller diameter than that of the rear first portion, there is less imbalance during the rotation of the optical element 9.

As a variant or in addition, provision may advantageously be made for at least one means for limiting condensation, this means being referred to below as the anti-condensation means. Such an anti-condensation means may be integrated into the housing 6. In particular, at least one anti-condensation means may be arranged on the wall 21 of the housing 6.

By way of nonlimiting example, the anti-condensation means may comprise at least one through-orifice 210 in the housing 6, in this example in the wall 21 (see FIG. 3). The one or more orifices 210 may be produced by drilling. Preferably, when a plurality of orifices 210 are provided, they are arranged symmetrically with respect to the axis of rotation A1 of the housing 6.

In the example illustrated in FIG. 3, two orifices 210 are provided, said orifices being arranged symmetrically with respect to the axis of rotation A1 of the housing 6. The orifices 210 communicate between the interior of the housing 6 and the exterior of the housing 6 when the protecting device 3 has been assembled. By way of nonlimiting example, each orifice 210 may have a diameter of about 5 mm.

In addition, provision may be made for one or more semipermeable membranes 211, said membranes being arranged at least in one orifice 210, respectively. In the example illustrated in FIG. 3, two membranes 211 have been schematically shown. Each membrane 211 may be sealtightly fastened to an associated orifice 210, for example by adhesive bonding or even by ultrasonic welding. These membranes 211 are, in the described embodiments, permeable to air and impermeable to water. The one or more membranes 211 thus promote the circulation of air in the interior of the housing 6. This allows good ventilation to be achieved between the optic 14 and the optical element 9 and thus prevents condensation from accumulating.

Advantageously, provision is furthermore made for at least one means for compensating for the lesser weight of the orifice 210 or orifices 210. In the particular example illustrated in FIG. 3, the two membranes 211 are placed symmetrically with respect to the axis of rotation A1 of the housing 6 and it is this symmetric arrangement that allows weight effects to be limited with respect to the centrifugal force during the rotation of the housing 6.

The optical element 9, for its part, is intended to protect the optic 14 of the optical sensor 13 from potential spatter with grime or solid debris that could damage this optic 14. It is therefore a question of an element for protecting, or more precisely a mask for protecting, the optical sensor 13, and it is this optical element 9 that is subjected to aggressions originating from the exterior, i.e. to water spatter, pollutants, small pieces of stone, but also pollutant deposits or water stains.

In the described embodiment, the optical element 9 is separate from the optical sensor 13.

This optical element 9 has an optical axis 91.

The optical element 9 is arranged at the front of the protecting device 3. In other words, the optical element 9 is arranged at the front of the accessory 4, or even at the front of the housing 6. The expression "front of the protecting device 3" is understood to mean the portion intended to be placed facing the road scene images of which the optical sensor 13 participates in capturing, when the protecting device 3 is installed in the vehicle 100 (FIG. 1). In contrast, the rear of the protecting device 3 is the portion opposite the front; it is therefore a question of the portion that is furthest from the road scene images of which the optical sensor 13 participates in capturing.

The optical element 9 is intended to be placed upstream of the optical sensor 13, and more precisely upstream of the optic 14 (FIGS. 2 and 3). In the present text, the term upstream is defined with respect to the optical axis 15 and with respect to the road scene images of which the optical sensor 13 participates in capturing. In other words, the expression "upstream of the optic 14" is understood to mean a position in which the optical element 9 is placed between the optic 14 and the road scene images of which the optical sensor 13 participates in capturing, along the optical axis 15.

This optical element 9 is advantageously dimensioned so as to cover all of the surface of the optic 14. The optical element 9 is therefore arranged in the field of view of the optical sensor 13. To this end, the optical element 9 is advantageously transparent in order not to decrease the effectiveness of the optical sensor 13. This optical element 9 may be made of glass or of a transparent plastic such as polycarbonate.

The optical element 9 may be arranged centred with respect to the optical sensor 13, and more precisely centred with respect to the optic 14. The optical element 9 is arranged so that its optical axis 91 is coincident with the optical axis 15 of the optical sensor 13.

As described above, the optical element 9 is securely fastened to the housing 6; it is therefore securely fastened rotationwise to the housing 6. Thus, the optical element 9 is also mounted so as to be able to rotate around the axis of rotation A1. More precisely, the housing 6 may be arranged so as to be driven to rotate by the motor 5, this allowing the optical element 9 to rotate. The optical element 9 is therefore configured to be driven to rotate with the housing 6, so as to allow the optical element 9 to be protected via a centrifugal effect.

Advantageously, the axis of rotation A1 of the optical element 9 is coincident with the optical axis 15 of the optical sensor 13. This axis of rotation A1 is also coincident with the optical axis 91 of the optical element 9.

The optical element 9 may be placed centred with respect to the axis of rotation A1. This optical element 9 is in particular axisymmetric with respect to the axis of rotation A1.

Moreover, when the protecting device 3 that accommodates the optical sensor 13 is installed in the vehicle 100 (the reader is also referred to FIG. 1), the optic 14 and the optical element 9 advantageously protrude from an aperture provided in the element 2 of the vehicle 100.

Furthermore, with reference again to FIG. 3, the optical element 9 has at least one planar surface 9a, 9b that is configured to be placed in the field of view V of the optical sensor 13. The at least one surface 9a, 9b is substantially, or even completely, planar throughout the field of view V of the optic 14 of the optical sensor 13. In other words, the optical element 9 is partially planar or completely planar in the field of view V of the optical sensor 13.

The one or more planar surfaces 9a, 9b are advantageously centred with respect to the optical sensor 13, and more precisely with respect to the optic 14.

In particular, in the described embodiment, the optical element 9 includes an internal surface 9a and an external surface 9b that are opposite. This internal surface 9a and external surface 9b are completely or partially located in the field of view of the optical sensor 13 when the optical sensor 13 is housed in the housing 6. Furthermore, each of these surfaces 9a, 9b or sections of surfaces located in the field of view V of the optical sensor 13 is partially or completely planar.

In the particular example illustrated in FIG. 3, the internal surface 9a and the external surface 9b are parallel.

Figure 4:
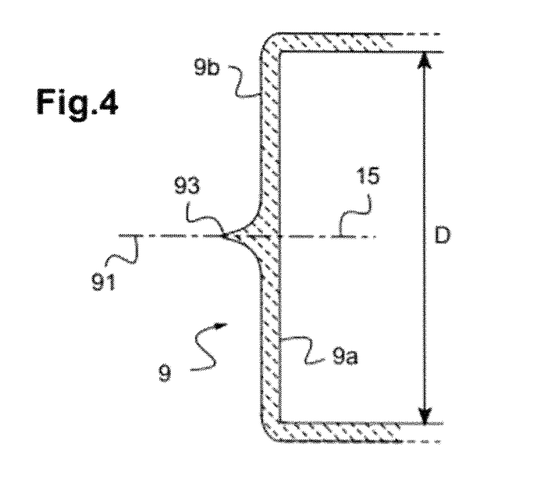
FIG. 4 is a transverse cross-sectional view of a variant embodiment of a substantially planar optical element for protecting the optical sensor.

In one variant embodiment illustrated in FIG. 4, the optical element 9 may have a relief 93. In particular, in this example, the relief 93 has a pointed shape, or a shape that narrows to a tip. The distance over which the relief 93 extends may be adapted depending on the requirements. In addition, this relief 93, which is for example pointed, is arranged substantially at the centre of the optical element 9, i.e. at the centre or in proximity to the centre, in particular of the external surface 9b of the optical element 9. In other words, the relief 93 is centred with respect to the optical axis 91 of the optical element 9, and therefore with respect to the optical axis 15 of the optical sensor 13. This discontinuity in the external surface 9b of the optical element 9 allows the ejection of grime, such as water droplets, located at the centre or in proximity to the centre of the optical element 9, and which are otherwise difficult to remove because the speed of rotation at the centre of the optical element 9 may be too low (or even zero) to eject them, to be facilitated.

Furthermore, with reference to FIGS. 3 and 4, the planar surfaces 9a, 9b of the optical element 9 have an extent D larger than or equal to the extent of the field of view V of the optical sensor 13. In the described embodiment, the extent D corresponds to the diameter of the substantially planar surfaces 9a, 9b of the optical element 9.

Figure 5:
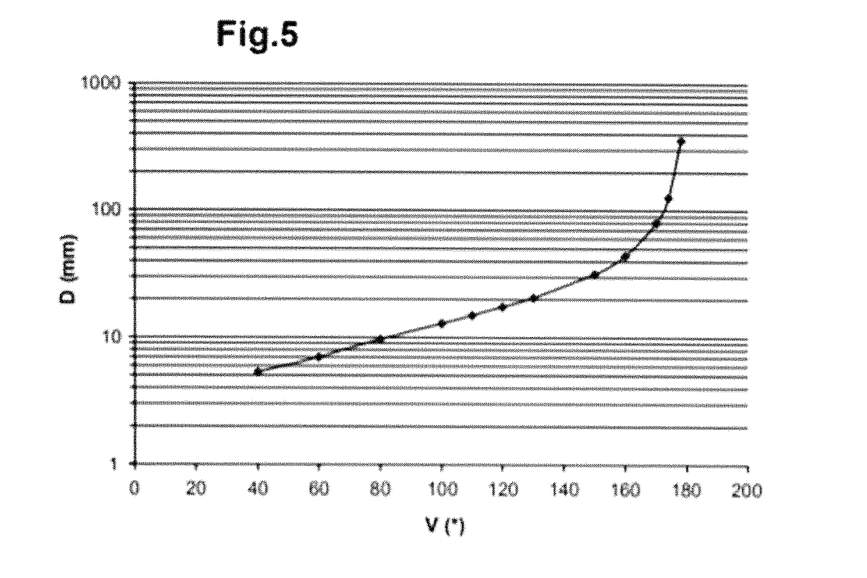
FIG. 5 is a curve showing the correspondence between the angle of the field of view of the optical sensor and the diameter of a substantially planar optical element for protecting the optical sensor.

FIG. 5 schematically illustrates examples of maximum diameter D of the substantially planar surfaces 9a, 9b of the optical element 9 as a function of the angle of the field of view V of the optical sensor 13, and for a distance of about one millimetre between the internal planar surface 9a and the objective 14. Of course, if the distance between the internal planar surface 9a and the objective 14 is increased, the diameter D also increases.

In particular, the optical sensor 13 accommodated in the housing 6 and arranged behind the substantially planar surfaces 9a, 9b of the optical element 9 may have a field of view V of angle strictly smaller than 180°. In particular, the optical sensor 13 may have a field of view V of angle smaller than or equal to 150°, and in particular smaller than or equal to 120°. In particular, the optical sensor 13 may have an angle of the field of view comprised between 40° and 130°, preferably between 50° and 120°, and for example of about 110°.

According to one nonlimiting illustrative example, the substantially planar surfaces 9a, 9b of the optical element 9 may have a diameter D of about 15 mm to 20 mm. With such a diameter D, the optical sensor 13 downstream of the optical element 9 may have a field of view V of angle of about 110° to 130°.

Other examples of correspondences between the diameter D in millimetres of the substantially planar surfaces 9a, 9b of the optical element 9 and the angle of the field of view V of the optical sensor 13 are given, by way of nonlimiting example, in the following table:

| Field of view V (°) | Diameter D (mm) |
|---|---|
| 178 | 360.48 |
| 174 | 127.32 |
| 170 | 80.36 |
| 160 | 44.42 |
| 150 | 31.8 |
| 130 | 20.68 |
| 120 | 17.5 |
| 110 | 15 |
| 100 | 12.96 |
| 80 | 9.66 |
| 60 | 7 |
| 40 | 5.3 |

These examples are given for a distance between the internal planar surface 9a and the objective 14 of about one millimetre. As described above, the diameter D increases if the distance between the internal planar surface 9a and the objective 14 increases.

The following mathematical formula may be used to determine the diameter D when the distance between the internal planar surface 9a and the objective 14 is larger:

$$D = 2 \tan\frac{V}{2} * (e + d) + Do$$

where:
D: is the diameter of the optical element
V: is the field of view
e: is the thickness of the optical element
d: is distance at the centre between the internal planar surface of the optical element and the objective of the optical sensor
Do: is outside diameter of the objective of the optical sensor According to one particular application, such as taking images of a blindspot, in particular when the protecting device 3 housing the optical sensor 13 in the housing 6 is arranged in an exterior side rearview mirror, the optical sensor 13 downstream of the partially or completely planar optical element 9 may have a more restricted field of view V, for example of angle of about 60°, without this being a hindrance.

Of course, in the case of other applications or uses of the driver-assistance system 1 (the reader is also referred to FIG. 1), a plurality of protecting devices 3 may be provided, each accommodating one optical sensor 13 downstream of an at least partially planar optical element 9 that is located in the respective field of view thereof. This multiple provision combined with a plurality of optical sensors 13 allows a larger overall field of view to be guaranteed, and thus various driver-assisting applications requiring a large field of view to be enabled.

Moreover, in order to prevent condensation forming between the optic 14 and the optical element 9, the internal surface 9a of the optical element 9 may advantageously have an anti-fog property. The internal surface 9a of the optical element 9 is the surface intended to be arranged facing the optic 14 of the optical sensor 13. In particular, the internal surface 9a of the optical element 9 has an anti-fog coating.

As a variant or in addition, the internal surface 9a and/or the external surface 9b of the optical element 9 may have one or more of the following properties: hydrophobic, infrared filter, photocatalytic, superhydrophobic, lipophobic, hydrophilic, or even superhydrophilic, stone-chip resistant, or even any other surface treatment allowing the adhesion of grime to be decreased. In particular, by virtue of the hydrophobic properties of the external surface of the optical element 9, any water droplets will run off the external surface without leaving stains because the water will not be able to adhere to this external surface. Thus, the layers or coatings on the external surface 9b of the optical element 9 allow the possibility of adherence of mineral or organic pollutants and the presence of water stains on the optical element 9, which could adversely affect correct operation of the driver 1, to be limited. Advantageously, a liquid solution, such as a solution of the Rain-X® type, may be deposited on the external surface 9b of the optical element 9 in order to form a hydrophobic pellicule.

These example embodiments are given by way of non-limiting illustration. For example, those skilled in the art will be able to use a transparent optical element 9 having an external surface 9b having other properties allowing the adherence of grime to this external surface 9b to be limited without departing from the scope of the present invention.

Optionally, the optical element 9 of the protecting device 3 may also comprise an integrated defrosting or demisting system in order to make it possible to guarantee that the driver-assistance system 1 is able to operate correctly whatever the meteorological conditions, such as a defrosting resistor or filament for example.

Motor

As regards the motor 5, various variants are shown in FIGS. 2, 3, 5 and 6; it may in particular be an electric motor of small size, or even a miniature electric motor.

The expression "electric motor of small size" is understood to mean, in the context of the present invention, a stepper motor, an actuator, a brushed or brushless DC motor, an asynchronous motor or a synchronous motor, the weight of which is lower than 10 kg, or even lower than 1 kg, and that is in particular used to actuate equipment in vehicles.

The expression "miniature electric motor" is understood to mean, in the context of the present invention, a stepper motor, an actuator, a brushed or brushless DC motor, an asynchronous motor or a synchronous motor, the weight of which is lower than 200 g, or even lower than 100 g, and preferably comprised between 30 g and 100 g, and for example between 30 g and 60 g.

The motor 5 includes a rotor 51 and a fixed stator 53, the rotor 51 being able to rotate with respect to the fixed stator 53.

The motor 5 is coupled to the housing 6 in order to drive the housing 6 and the optical element 9 to rotate. In the described embodiment, the housing 6 and the optical element 9 are securely fastened to the rotor 51 of the motor 5.

In the embodiment illustrated in FIGS. 2, 3 and 5, the rotor 51 is placed around the stator 53. The stator 53 is therefore internal and the rotor 51 external. Moreover, in the example of FIG. 5, the stator 53 may form the holder 17 of the optical sensor 13. In other words, the holder 17 and the stator 53 form a single part.

Figure 6:
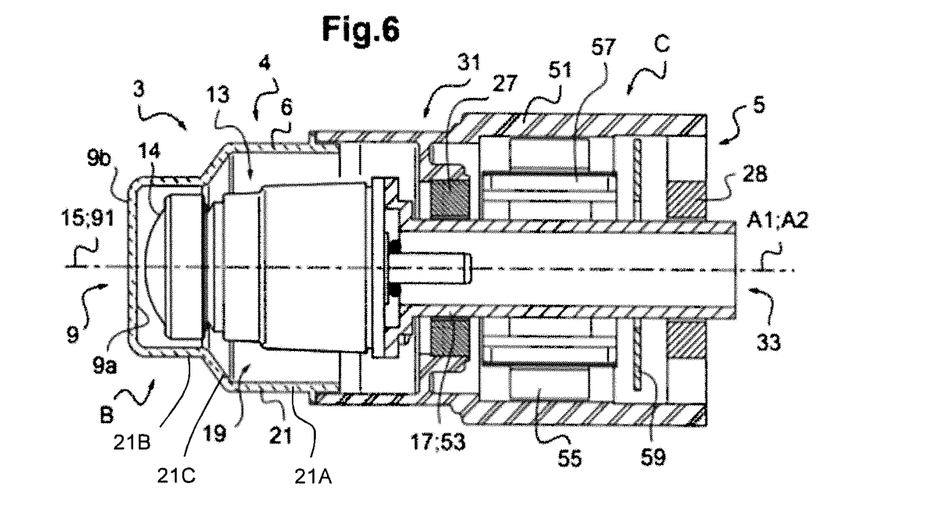
FIG. 6 is one variant of the protecting device.
Figure 7:
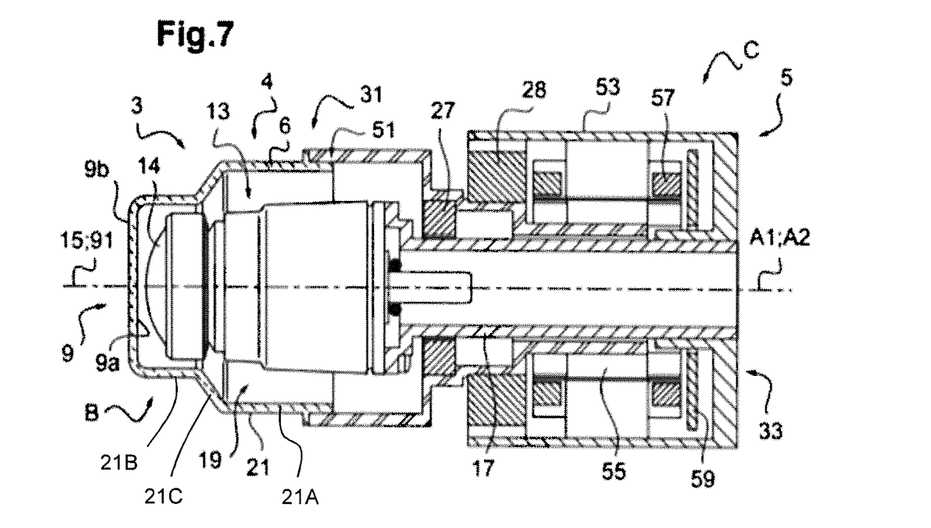
FIG. 7 is another variant of the protecting device.

Alternatively, as illustrated in FIG. 6, the stator 53 may be arranged around the rotor 51.

Moreover, the motor 5 is assembled with the rear of the housing 6. In the described embodiment, the motor 5 is arranged on the side opposite to the optical element 9. Thus, a seal-tight unit is formed that thus prevents grime from getting into the interior of the housing 6 that is intended to accommodate the optical sensor 13.

Furthermore, the motor 5 is in this example arranged in the extension of the optical sensor 13.

The motor 5 is advantageously a hollow motor 5. It may at least partially accommodate the optical sensor 13. Advantageously, the hollow motor 5 is configured to accommodate an interconnect of the optical sensor 13, in particular for power supply and/or processing of the signal.

In particular, in the illustrated configuration, it is the fixed stator 53 of the motor 5 that is hollow and that may accommodate a portion of the optical sensor 13, in particular a rear portion of the optical sensor 13 on the side opposite to the optic 14, and even more precisely the fixed holder 17 of the optical sensor 13.

The motor 5 is for example supplied with electrical power by a power supply that is connected to the general electrical circuit of the vehicle 100 (the reader is also referred to FIG. 1).

By way of nonlimiting example, the motor 5 may more particularly be a brushless motor. In the example illustrated in FIG. 3, the motor 5 comprises at least one magnet 55 that is securely fastened rotationwise to the rotor 51, and a predefined number of electromagnetic coils 57, in particular at least three electromagnetic coils 57 that are mounted on the stator 53. The electromagnetic coils 57 are intended to be supplied with power in order to allow the magnet 55 that is securely fastened to the rotor 51 to be driven. The motor 5 comprises, for this purpose, a circuit 59 for controlling the supply of power to the electromagnetic coils 57. This control circuit 59 may be connected to a power-supply wiring harness 61 that is connected to the general electric circuit of the vehicle 100 (the reader is also referred to FIG. 1).

The motor 5 may have a speed of rotation comprised between 1000 and 50000 revolutions/minute, preferably between 5000 and 20000 revolutions/minute, and even more preferably between 7000 and 15000 revolutions/minute. Such speeds of rotation allow any grime that has been deposited on the optical element 9 to be removed via a centrifugal effect and thus allow the optic 14 of the optical sensor 13 to be kept clean in order to ensure the driver-assistance system 1 operates optimally.

In the embodiment illustrated in FIGS. 2 and 3, the motor 5 is arranged to the rear of the protecting device 3. In other words, the motor 5 is arranged on the side opposite to the optical element 9.

The motor 5 is configured to drive the accessory 4, namely in this example the housing 6 and the optical element 9 that is securely fastened to the housing 6, to rotate.

The motor 5 is mounted so as to be able to rotate about an axis of rotation A2. The motor 5 is for example arranged so that its axis of rotation A2 is coincident with the axis of rotation A1 of the optical element 9, and with the optical axis 15 of the optical sensor 13.

Moreover, provision is advantageously made for a seal-tight arrangement for the passage of cables or wires to the rear of the motor 5, in order to limit the ingress of water vapour and/or other contaminants into the interior of the protecting device 3.

The protecting device 3 therefore includes a movable portion 31, also called the rotating portion 31, and a fixed portion 33 (see FIG. 3).

The movable portion 31 comprises at least the rotor 51 of the motor 5, and the fixed portion 33 comprises at least the stator 53 of the motor 5.

The movable portion 31 of the motorized device 3 may also include at least one movable element that is securely fastened rotationwise to the rotor 51, such as in particular the accessory 4, i.e. the housing 6 and the optical element 9 in this example.

Likewise, the fixed portion 33 may also comprise an element or holder that is fastened to the stator 53. Of course, the element or holder may or may not be fastened directly to the stator 53. Nonlimitingly, in this example, the fixed portion 33 of the motorized device 3 includes the fixed holder 17 of the optical sensor 13. This fixed holder 17 is in particular fastened to the stator 53.

The holder 17 of the optical sensor 13 and the stator 53 advantageously include respective complimentary apertures 63, 65 in order to allow the control circuit 59 to be connected to the power-supply wiring harness 61.

Furthermore, the protecting device 3 may in particular comprise one or more bearings 27, 28, which are schematically shown in FIGS. 3, 5 and 6. In these examples, the protecting device 3 comprises two bearings 27, 28.

These bearings 27, 28 are each arranged between the movable portion 31 and the fixed portion 33 of the protecting device 3. The bearings 27, 28 are of substantially annular general shape. In addition, the two bearings 27, 28 are arranged concentrically with the motor 5.

With reference to the particular example illustrated in FIG. 3, one of the bearings, for example the bearing 27 may be placed between the rotor 51 and a portion, in particular a front portion, of the holder 17 of the optical sensor 13. The other bearing, the bearing 28 in the example of FIG. 3, is placed between the rotor 51 and the stator 53 of the motor 5.

Alternatively, the two bearings 27 and 28 may be arranged between the rotor 51 and the stator 53. In particular, in the variant embodiment illustrated in FIG. 5, the two bearings 27, 28 are arranged between the rotor 51 and the stator 53 that forms the holder 17 of the optical sensor 13.

Moreover, at least one of these bearings 27, 28 may be a magnetic bearing. Such a magnetic bearing allows the noise and friction generally generated when a protecting device 3 using mechanical bearings is operated to be avoided.

According to one variant, one bearing may be magnetic and the other bearing may be a mechanical bearing such as a ball bearing. According to another variant, the motorized device 3 may comprise a single magnetic bearing.

Thus, in operation, the actuator, and more precisely the motor 5, drives the housing 6 and the optical element 9 that is securely fastened to the housing 6 to rotate with respect to the optical sensor 13. The rotation of the housing 6 and of the optical element 9 ensures the removal of grime via the centrifugal force that the latter experiences. The field of view V of the optical sensor 13 is thus always free and clean.

The at least partially planar optical element 9 may be produced simply. Furthermore, the diameter D of the substantially planar surfaces 9a, 9b of the optical element 9 upstream of the optic 14 of the optical sensor 13 may be adapted, by a person skilled in the art, depending on the angle of view required for a given application in the field of driver-assistance systems.

Lastly, the fact that the optical element 9 is completely or partially planar in the field of view V of the optical sensor 13 does not adversely affect the driver-assistance system. On the contrary, this is particularly advantageous when it is desired to produce compact systems as the diameter of the optical element 9, and in particular of its substantially planar surfaces 9a, 9b, may be decreased, for example for applications not requiring a very large field of view, such as the capture of images of a blindspot. In addition, the planar surfaces 9a, 9b have no effect or almost no effect on the optical performance, and in particular the performance in terms of modulation transfer function (MTF).

The invention claimed is:

1. A device for an optical sensor for a motor vehicle, said optical sensor comprising an optic, the device comprising:

a housing that is mounted to be able to rotate around an axis of rotation and that has a compartment that is configured to accommodate the optical sensor;

an optical element that is securely fastened to the housing, the optical element having at least one planar surface that is configured to be placed in the field of view of the optical sensor; and an actuator that is coupled to the housing to drive the housing and the optical element to rotate, wherein the actuator is disposed entirely behind the housing, wherein the optical sensor and the actuator comprise respective complimentary apertures for connecting to a power-supply wiring harness, and wherein the housing further comprises an anti-condensation means comprising at least two orifices arranged symmetrically about the axis of rotation of the housing, wherein the orifices provide ventilation and prevent condensation from accumulating.

2. The device according to claim 1, wherein said at least one planar surface has an extent larger than or equal to the extent of the field of view of the optical sensor.

3. The device according to claim 1, wherein the optical element is configured to be arranged so that said at least one planar surface is centered with respect to the optical sensor.

4. The device according to claim 1, wherein the optical element includes an internal surface and an external surface that are opposite and respectively at least partially planar in the field of view of the optical sensor.

5. The device according to claim 1, wherein the optical element is configured to be placed upstream of the optic of the optical sensor so that the optical axis of the optical element is coincident with the optical axis of the optical sensor.

6. The device according to claim 1, wherein the optical element is placed centered with respect to the axis of rotation of the housing.

7. The device according to claim 1, wherein the compartment of the housing is configured to accommodate the optical sensor so that the optical axis of the optical sensor is coincident with the axis of rotation.

8. The device according to claim 1, wherein the compartment for the optical sensor is defined by a wall of the housing.

9. The device according to claim 8, wherein the wall is centered on the axis of rotation of the housing.

10. The device according to claim 1, wherein one or more semipermeable membranes are arranged in each of the orifices.

11. A driver-assistance system comprising:
an optical sensor comprising an optic; and
a device for the optical sensor according to claim 1.

12. The driver-assistance system according to claim 11, wherein the planar surface of the device has an extent larger than or equal to the extent of the field of view of the optical sensor.

13. The driver-assistance system according to claim 11, wherein the optical sensor accommodated in the housing has a field of view of angle strictly smaller than 180°.

14. A device for an optical sensor for a motor vehicle, said optical sensor comprising an optic, the device comprising:

a housing that is mounted to be able to rotate around an axis of rotation and that has a compartment that is configured to accommodate the optical sensor;

an optical element that is securely fastened to the housing, the optical element having at least one planar surface that is configured to be placed in the field of view of the optical sensor;

an actuator that is coupled to the housing to drive the housing and the optical element to rotate; and a cylindrical fixed portion disposed entirely behind the optical sensor, wherein a motor is disposed on and in contact with an outer lateral periphery of the cylindrical fixed portion, wherein the housing further comprises an anti-condensation means comprising at least two orifices arranged symmetrically about the axis of rotation of the housing, wherein the orifices provide ventilation and prevent condensation from accumulating.

15. A device for an optical sensor for a motor vehicle, said optical sensor comprising an optic, the device comprising:

a housing that is mounted to be able to rotate around an axis of rotation and that has a compartment that is configured to accommodate the optical sensor;

an optical element that is securely fastened to the housing, the optical element having at least one planar surface that is configured to be placed in the field of view of the optical sensor;

an actuator that is coupled to the housing to drive the housing and the optical element to rotate; and a relief that has a shape that narrows to a point, the relief being centered with respect to the optical axis of the optical element and projecting forward from a front surface of the optical element, wherein the housing further comprises an anti-condensation means comprising at least two orifices arranged symmetrically about the axis of rotation of the housing, wherein the orifices provide ventilation and prevent condensation from accumulating.

16. The device according to claim 15, wherein the relief is disposed at the optical axis of the optical sensor.

17. The device according to claim 15, wherein the relief is disposed at the axis of rotation of the actuator.

* * * * *